United States Patent [19]

Hoess et al.

[11] Patent Number: 5,135,985

[45] Date of Patent: Aug. 4, 1992

[54] HOMOGENEOUS MIXTURE OF POLYMETHACRYLIMIDE POLYMERS

[75] Inventors: Werner Hoess, Griesheim; Heinz Vetter, Rossdorf; Jens-Dieter Fischer, Bickenbach; Hartmut Schikowsky, Darmstadt, all of Fed. Rep. of Germany

[73] Assignee: Röhm GmbH, Darmstadt, Fed. Rep. of Germany

[21] Appl. No.: 698,291

[22] Filed: May 10, 1991

[30] Foreign Application Priority Data

May 11, 1990 [DE] Fed. Rep. of Germany ........ 4015182

[51] Int. Cl.$^5$ .................... C08L 39/04; C08L 33/06
[52] U.S. Cl. .................................. 525/205; 525/228; 525/230
[58] Field of Search ............... 525/205, 207, 228, 230

[56] References Cited

U.S. PATENT DOCUMENTS

| | | | |
|---|---|---|---|
| 2,146,209 | 2/1939 | Graves | 260/2 |
| 3,284,425 | 11/1966 | Schroeder et al. | 260/89.5 |
| 4,727,117 | 2/1988 | Hallden-Abberton et al. | 525/343 |
| 4,954,574 | 9/1990 | Hallden-Abberton et al. | 525/327.6 |
| 5,004,777 | 4/1991 | Hallden-Abberton et al. | 525/205 |

FOREIGN PATENT DOCUMENTS

| | | |
|---|---|---|
| 0216505 | 4/1987 | European Pat. Off. |
| 0234726 | 9/1987 | European Pat. Off. |
| 1077872 | 3/1960 | Fed. Rep. of Germany |

*Primary Examiner*—Paul R. Michl
*Assistant Examiner*—Peter Szekely

[57] ABSTRACT

Homogeneous polymer mixtures of polymethacrylimides consist of a component (A), composed of from 30 to 90 percent by weight of methacrylalkylimide units and from 3.5 to 10 percent by weight of methacrylic acid units, and of a component (B1) or (B2) having from 10 to 50 percent by weight more methacrylalkylimide units than component (A), component (B1) having a degree of imidization of less than 95 percent and containing from 3.5 to 10 percent by weight of methacrylic acid units, and component (B2) having a degree of imidization greater than 95 percent and containing less than 3.5 percent by weight of methacrylic acid units.

1 Claim, No Drawings

HOMOGENEOUS MIXTURE OF POLYMETHACRYLIMIDE POLYMERS

The present invention relates to homogeneous mixtures of polymethacrylimide polymers.

It is known from European patent 216,505 that polymethacrylalkylimides are not readily compatible with other thermoplastic polymers if they contain more than about 0.3 to 0.4 milliequivalents of carboxylic acid groups or carboxylic anhydride groups. This corresponds to a content of about 2.5 to 3.5 percent by weight of methacrylic acid and/or methacrylic anhydride units. Such units are formed, in addition to methacrylic acid alkylimide units, during the reaction of polymethyl methacrylate with primary amines. With high degrees of imidization, that is, when 95 percent or more of the imidizable groups of the polymer have been converted to imide groups, the content of carboxylic acid or carboxylic anhydride groups usually is below the aforesaid limit. As taught by said patent, the miscibility of polymethacrylalkylimide polymers with other thermoplastic polymers is improved when the methacrylic acid and/or methacrylic anhydride units are reduced to a total of less than 2.5 to 3.5 percent by weight. This can be accomplished by an aftertreatment of the polymer with an alkylating agent, such as esters of orthoformic acid, with formation of methacrylic ester units. However, this is an additional and costly, and therefore undesirable, process step.

European patent 216,505 describes mainly mixtures of polymethacrylalkylimide polymers with other polymers. So far as mixtures of polymethacrylalkylimides with one another are concerned, said patent states that they will be homogeneous when at least one of the polymers entering into the mixture has been subsequently alkylated in the manner described.

The homogeneity of a polymer mixture can be determined reliably by differential scanning calorimetry (DSC). With this analytical method, a homogeneous mixture will show only one value for the glass transition temperature. Inhomogeneous mixtures, in which several separate polymer phases are present, will show various values for the glass transition temperature, which correspond to the glass transition temperatures of the individual phases. The end-use properties of the mixture change as soon as the glass transition temperature is exceeded. When a mixture is formed of different polymers having different glass transition temperatures, a change in end-use properties will occur in the case of an inhomogeneous polymer mixture as soon as the lowest glass transition temperature of the constituent phases is exceeded. In a homogeneous mixture, on the other hand, the single glass transition temperature is at a level intermediate between those of the individual phases, in other words, always higher than the lowest glass transition temperature of the various components of the mixture. If a given glass transition temperature is to be obtained by mixing different polymers, homogeneous miscibility of the polymers will be a primary requirement. Similarly, other important end-use properties of polymers, such as their water absorption capability, will be better than those of the component exhibiting the poorest characteristics in a particular respect only if the mixture is homogeneous.

As a rule, polymethacrylalkylimide polymers are not compatible, that is, homogeneously miscible, with other polymers if they contain more than from 2.5 to 3.5 percent by weight of methacrylic acid units. On the other hand, the present inventors have found that methacrylic anhydride units have only a minor effect on compatibility. For example, a polymethacrylalkylimide polymer with a degree of imidization of 52 percent which contains 2.5 percent by weight of methacrylic acid units and 5 percent by weight of methacrylic anhydride units is not compatible with polymethyl methacrylate. Nor is an almost completely imidized polymethacrylalkylimide polymer with a degree of imidization of 97 percent, for example, and less than 2 percent by weight of methacrylic acid units, compatible with a polymethacrylalkylimide polymer with a low degree of imidization (25 percent, 1.6 percent by weight of methacrylic acid, 7.3 percent by weight of methacrylic anhydride).

The most important property of polymethacrylalkylimide polymers from the end-use point of view is their glass transition temperature, which is high in comparison with other engineering polymers. For pure polymethacrylmethylimide, it is about 175° C. The thermoplastic processing of this polymer calls for temperatures about 130° C. above that level. Moreover, the polymer has a much higher melt viscosity than a polymethacrylmethylimide with a lower degree of imidization, and usually also a yellowish color.

Since in the processing of thermoplastics it is generally sought to use as low a processing temperature as possible, and since the processing temperature can be the lower the lower the glass transition temperature of the polymer, it is desirable that the glass transition temperature of the polymer being processed not be higher than is absolutely necessary for end-use reasons. It is also desirable to avoid the high viscosity and yellowish color of pure polymethacrylmethylimide.

Since the glass transition temperature of polymethacrylalkylimide polymers, starting with polymethyl methacrylate, steadily increases with the degree of imidization, it is possible in principle, through appropriate choice of the degree of imidization, to produce polymethacrylalkylimide polymers with any desired glass transition temperature between 107° and 175° C. To be able to meet all end-use requirements of the processors, the manufacturer would have to produce and offer a broad range of differently imidized polymethacrylalkylimide polymers. Now this is hardly justifiable economically. It would be more economical to produce just a few polymer types with different degrees of imidization and to bring about the glass transition temperature required in a given case by homogeneous mixing. In the light of the findings of European patent 216,505, however, the preparation of homogeneous mixtures requires that at least one of the polymethacrylalkylimide polymers entering into the mixture first undergo an aftertreatment with an alkylating agent to reduce or eliminate the methacrylic acid and methacrylic anhydride content.

The object of the invention is to provide homogeneous mixtures of polymethacrylalkylimide polymers which can be prepared without subsequent alkylation.

The invention relates to a homogeneous polymer mixture containing at least two polymethacrylalkylimide polymers (A) and (B) having different degrees of imidization. Polymethacrylalkylimide polymer (A) contains from 30 to 90 percent by weight of methacrylalkylimide units and from 3.5 to 10 percent by weight of methacrylic acid units, the balance, if any, being composed predominantly of units of methyl methacrylate and/or of methacrylic anhydride. The polymethacrylalkylimide polymer (B) contains from 10 to 50 weight percent more methacrylalkylimide units than the polymethacrylimide polymer (A). Suitable for use as polymer (B) are two different types of polymethacrylalkylimide polymers, which may be designated polymer (B1) and polymer [B2). Type (B1) has a degree of imidization of less than 95 percent and contains from 3.5 to 10 percent by weight of methacrylic acid units. Type (B2) has a degree of imidization greater than 95 percent and contains less than 3.5 weight percent of methacrylic acid units. The balance, if any, of the polymers (B1) and (B2) is composed predominantly of units of methyl methacrylate and/or methacrylic anhydride.

Polymethacrylalkylimide polymers of the types (A) and (B) are obtainable by reacting polymethyl methacrylate with imidizing agents without subsequent alkylation. It is thus possible under the invention to prepare from a range of just three polymers with different degrees of imidization, for example, with 30, 70 and 100 percent by weight of methacrylalkylimide units, homogeneous polymer mixtures based on polymethacrylalkylimides having any desired glass transition temperature in the range from 125° C. to 175° C. without having to resort to the use of a component that must be alkylated in an expensive aftertreatment. If desired, the range of available polymers may be extended to four or more types.

A further advantage of the invention is that it makes it possible to obtain mixtures with a relatively low methacrylic acid content which are distinguished by a reduced tendency to absorb water and by a reduced sensitivity to alkalies. To this end, there may be used as component (B) a polymer with a high degree of imidization and a correspondingly low content of carboxylic acid units, in other words, a polymer (B2) with from 95 to 100 percent by weight of methacrylalkylimide units and less than 3.5 percent by weight of methacrylic acid. Mixing it with a component (A) with a lower degree of imidization then yields a mixture having the desired average degree of imidization and a corresponding softening point but a much lower carboxylic acid content than a homogeneous polymer with the same degree of imidization would have.

For example, reacting polymethyl methacrylate with 1.4 times the base-molar amount of methylamine yields a polymethacrylmethylimide with a degree of imidization of 75 percent and a Vicat softening point of 156° C. It contains about 5 percent by weight of methacrylic acid units and 2.5 percent by weight of methacrylic anhydride units. A mixture having the same average degree of imidization can be prepared from 50 percent by weight of polymethacrylmethylimide with a degree of imidization of 50 percent, 2.5 weight percent of methacrylic acid units, and 5.0 weight percent of methacrylic anhydride units; Vicat softening point, 135° C.

50 percent by weight of polymethacrylmethylimide with a degree of imidization of 99 percent, 1.0 weight percent of methacrylic acid units, and less than 0.5 weight percent of methacrylic anhydride units; Vicat softening point, 178° C.

The mixture is found to have a content of 1.9 percent by weight of methacrylic acid units and 2.9 percent by weight of methacrylic anhydride units. The Vicat softening point of the mixture is 152° C.

The polymers (A) and (B) can be produced by imidization of thermoplastic polyalkyl methacrylates by known methods. The polymer of alkyl esters of methacrylic acid used as the starting polymer is composed of at least 24 and usually more than 50 percent by weight, preferably more than 80 and most preferably from 95 to 100 percent by weight, of units of alkyl esters of methacrylic acid having from 1 to 4 carbon atoms in the alkyl group. Methyl methacrylate is preferred. Suitable comonomers are all monomers which can be copolymerized with it, and particularly alkyl esters of acrylic acid having from 1 to 4 carbon atoms in the alkyl group, acrylic acid and/or methacrylic acid, acrylonitrile and/or methacrylonitrile, acrylamide and/or methacrylamide, or styrene. Preferred are thermoplastically processable polymers of this type with a reduced viscosity ranging from 20 to 92, and preferably from 40 to 80, ml/g. They are preferably used in powder or granular form with an average particle size ranging from 0.03 to 3 mm.

The imidizing agent is usually a primary aliphatic amine, and preferably an alkylamine having from 1 to 12 carbon atoms in the alkyl group, and more particularly methylamine. Cycloaliphatic or araliphatic amines, such as cyclohexylamine or benzylamine, are also suitable for use. In place thereof, derivatives of the primary amines may be used which under the conditions of the imidizing process act like it, that is, produce imidization. These derivatives include the salts of the primary amines with organic or inorganic acids, such as hydrochloric acid, carbonic acid, formic acid or acetic acid, as well as ureas, thioureas, carbamates, guanidines, formamides and acetamides, amides of other aliphatic or aromatic carboxylic acids, and sulfonamides. Mixtures of several imidizing agents may also be used, if desired.

Degree of imidization is the percentage of the weight of the polymer represented by the methacrylalkylimide units. The magnitude of the degree of imidization is a function of the amount of imidizing agent used per base mol of methacrylate units. Since the imidization usually does not run to completion, more imidizing agent is always used than the amount theoretically calculated. For example, when from 0.4 to 0.5 mol of an imidizing agent is used per base mol of PMMA, a polymethacrylalkylimide polymer of the type (B1) with a degree of imidization of 30 percent is obtained. With an equivalent amount of the imidizing agent, the reaction stops at a degree of imidization of about 60 to 75 percent. Imidization of over 95 percent and up to 100 percent (type [B2]) is achieved only when 1.8 mols or more of imidizing agent per base mol of ester groups are used.

The imidizing process proceeds optimally at temperatures above the melting point, or at least 60° C. to 120° C. above the Vicat softening point, of the starting polymer. The preferred temperature range is 140° C. to 400° C., and more particularly 200° C. to 300° C. The reaction is preferably carried out at from 20 to 500 bars. The reaction time depends on the reaction conditions. In the case of imidization in an extruder, a reaction time of from 10 seconds to 30 minutes, and preferably from 1 to 7 minutes, will be sufficient.

If desired, the reaction may be carried out in the presence of solvents or diluents, as known from U.S. Pat. No. 2,146,209, German patents 1,077,872 and 1,088,231, or European patent 234,726, for example. Suitable solvents or diluents are mainly those which are liquid at room temperature and volatile at elevated temperature, optionally under vacuum, and can readily be separated from the imidized polymer. Illustrative of suitable solvents or diluents are petroleum-base oils, aliphatic hydrocarbons, aromatics, alkanols, ethers, ketones, esters, halogenated hydrocarbons, as well as water.

The polymers (A) and (B) are produced separately and then mixed in the desired ratio. Appropriate mixing ratios range from 1:99 to 99:1, for example, and preferably from 10:90 to 90:10. The content of carboxylic acid and carboxylic anhydride groups will be the lower the higher the proportion of the polymer (A) is, and the lower the content of carboxylic acid and carboxylic anhydride groups of polymer (A). The latter preferably represents from 20 to 60 percent by weight of the mixture.

Since the polymers (A) and (B) are produced as a melt or solution, they are best mixed in that form without being first cooled or separated from the solvent. For example, the polymers (A) and (B) may be produced individually in a screw extruder and from there fed to a third screw extruder, where they are homogeneously mixed. There the volatile reaction products, that is the alkanol split off during the imidization, as well as excess amine and any solvent which may have been used, can then be removed in vapor form in an appropriate venting zone. The polymer mixture from which the volatile constituents have been eliminated is then extruded, cooled, and granulated. If desired, the melt can be extruded directly into sheet or film webs or as profiles.

The polymer mixture obtained can be conventionally processed thermoplastically as a granular molding composition. Since it contains fewer carboxylic acid groups, it exhibits better miscibility and compatibility with other polymers, such as polyamides or styrene-acrylonitrile copolymers. For the same reason, its water absorption upon exposure to moisture is from 1 to 2 percent by weight lower. The likelihood of crack formation due to swelling stresses resulting from water absorption therefore is also minimized.

A better understanding of the present invention and of its many advantages will be had from the following Example, given by way of illustration.

EXAMPLE

The following polymethacrylmethylimides are used to prepare mixtures in accordance with the invention:

|    | MMI % | MAC % | MAN % | MAC + MAN % | Vicat S. P. °C. |
|----|-------|-------|-------|-------------|-----------------|
| P1 | 99    | 1     | 0     | 1           | 178             |
| P2 | 95    | 5.0   | 0.5   | 5.5         | 170             |
| P3 | 70    | 4.0   | 3.6   | 7.6         | 150             |
| P4 | 50    | 3.5   | 5.0   | 8.5         | 135             |

MMI = Methacrylmethylimide units (wt. %)
MAC = Methacrylic acid units (wt. %)
MAN = Methacrylic anhydride units (wt. %)
Balance made up of methyl methacrylate units From the polymethacrylmethylimides P1 to P4, mixtures having the following compositions and properties are produced by mixing the melts in the extruder at from 250° C. to 300° C.:

| Composition     | MMI % | MAC % | MAN % | MAC + MAN % | Vicat S. P. °C. |
|-----------------|-------|-------|-------|-------------|-----------------|
| 50% P1 + 50% P4 | 75    | 2.4   | 2.9   | 5.3         | 147             |
| 50% P1 + 50% P3 | 85    | 1.8   | 3.2   | 5.0         | 165             |
| 50% P1 + 50% P2 | 97    | 3.1   | 0.5   | 3.6         | 175             |

The three mixtures are transparent and upon differential thermal analysis show a single glass transition temperature. From this it follows that the mixture is homogeneous.

When for comparison 50 parts by weight of polymethyl methacrylate and
50 parts by weight of polymethacrylmethylimide P4 (50% MMI) are mixed in the same way, a milky, cloudy mixture is obtained which has two separate glass transition temperatures at 109° C. and 132° C. These correspond to the components PMMA and P4.

When equal parts of polymethacrylmethylimides of the compositions

P5 25% MMI, 1.5% MAC, 7.3% MAN, Vicat S. P. 121° C.

P6 97% MMI, 2.5% MAC, 0% MAN, Vicat S. P. 173° C.

are mixed, a milky, cloudy mixture is also obtained. It has two separate glass transition temperatures at 126° C. and 161° C., which correspond to the components P5 and P6.

From this it follows that polymethacrylmethylimides are not miscible outside of the range claimed.

What is claimed is:

1. A homogeneous polymer mixture containing at least two polymethacrylalkylimide polymers (A) and [B) having different degrees of imidization, wherein polymethacrylalkylimide polymer (A) contains from 30 to 90 percent by weight of methacrylalkylimide units and from 3.5 to 10 percent by weight of methacrylic acid units, the balance, if any, being composed predominantly of units of methyl methacrylate and/or of methacrylic anhydride, and wherein polymethacrylalkylimide polymer (B) contains from 10 to 50 percent by weight more methacrylalkylimide units than the polymethacrylimide polymer (A) and further contains from 3.5 to 10 percent by weight of methacrylic acid units if its degree of imidization is less than 95 percent (B1), or less than 3.5 percent by weight of methacrylic acid units if its degree of imidization is greater than 95 percent (B2), the balance, if any, being composed predominantly of units of methyl methacrylate and/or of methacrylic anhydride.

* * * * *